United States Patent [19]

Hamel et al.

[11] Patent Number: 4,520,137

[45] Date of Patent: May 28, 1985

[54] ONE-PART ACTIVATOR AND BLOWING AGENT FOR FOAMING PLASTICS

[75] Inventors: Roger G. Hamel, Methuen; Susan B. Poulin, Woburn, both of Mass.

[73] Assignee: Morton Thiokol Inc., Chicago, Ill.

[21] Appl. No.: 635,016

[22] Filed: Oct. 18, 1984

Related U.S. Application Data

[62] Division of Ser. No. 536,332, Sep. 27, 1983.

[51] Int. Cl.$^3$ .............................. C08J 9/06; B29N 7/20
[52] U.S. Cl. ........................................ 521/79; 264/54; 264/DIG. 5; 264/141; 521/81; 521/85; 521/92; 521/139; 521/143; 521/146; 521/149; 521/150
[58] Field of Search ................. 521/79, 81, 85, 89, 521/92; 264/141, 54, DIG. 5

[56] References Cited

U.S. PATENT DOCUMENTS

| | | | |
|---|---|---|---|
| 2,758,980 | 8/1956 | Talalay et al. | 521/85 |
| 2,909,493 | 10/1959 | Bush | 521/85 |
| 2,930,771 | 3/1960 | Wade | 521/85 |
| 2,951,819 | 9/1960 | Wade | 521/85 |
| 3,167,520 | 1/1965 | Wade | 521/85 |
| 3,331,790 | 7/1967 | Scheurlen et al. | 521/85 |
| 3,393,260 | 7/1968 | Miler | 521/79 |
| 4,394,458 | 7/1983 | Wade | 521/85 |
| 4,397,948 | 8/1983 | Wade | 521/85 |
| 4,399,238 | 8/1983 | Wade | 521/85 |
| 4,491,554 | 1/1985 | Hamel et al. | 521/85 |

Primary Examiner—Morton Foelak
Attorney, Agent, or Firm—G. K. White

[57] ABSTRACT

A one-part activator and blowing agent system for foaming plastics comprising an alkali metal borohydride and a salt hydrate blended in a single pellet or as separate pellets with a dry inert resinous polymer carrier. The one-part system is blended with a resinous polymer and then the blend extruded at a temperature at which the blend becomes molten such that the salt hydrate releases its water of hydration to hydrolyze the borohydride and produce a cellular article.

12 Claims, No Drawings

ONE-PART ACTIVATOR AND BLOWING AGENT FOR FOAMING PLASTICS

This application is a division, of application Ser. No. 536,332, filed Sept. 27, 1983.

BACKGROUND OF THE INVENTION

1. Field of the Invention

The present invention relates to the use of alkali metal borohydrides as blowing agents in connection with the production of foamed plastics.

2. Description of the Prior Art

The use of alkali metal borohydrides, such as sodium borohydride and potassium borohydride, as blowing agents in connection with the production of cellular articles is well known. For example, U.S. Pat. No. 2,951,819 utilizes an alkali metal borohydride in connection with the manufacture of cellular articles. U.S. Pat. No. 3,167,520 relates to cellular articles prepared from polystyrene by extruding polystyrene resin containing an alkali metal borohydride which decomposes during extrusion to form a cellular article.

U.S. Pat. Nos. 4,394,458 and 4,399,238, both assigned to the same assignee as the present application, disclose the use of alkali metal borohydrides such as sodium and potassium borohydride as blowing agents useful in connection with the production of articles having a foamed or cellular structure. One particularly advantageous embodiment of the inventions described therein involves the use of a stable borohydride concentrate mixture containing from about 0.5% to 20% by weight of an alkali metal borohydride with a dry inert resinous polymer. The concentrate typically contains no more than about 0.1% absorbed water or the borohydride will hydrolyze.

The concentrates described therein may be made by dry blending from 0.5 to 20% by weight of powdered alkali metal borohydride with a dry inert resinous polymer to form a mixture containing less than about 0.1% by weight water; heating the mixture to a temperature above the melting point of the resin to form a molten mixture; extruding the molten mixture and then cooling the extrusion to form a solid, stable concentrate; and then forming the cooled extruded concentrate into pellets by conventional techniques such as chopping, grinding and the like. Another aspect of the invention disclosed therein comprises a method for making cellular articles by contacting a mixture of alkali metal borohydride and a resinous polymer with a high surface area silica activating agent having a proton source adsorbed on its surface to hydrolyze the alkali metal borohydride, thereby causing the resinous polymer to have a foamed cellular structure. The alkali metal hydride therein may be in the form of the concentrate described therein or as neat powdered alkali metal borohydride.

The system described in the above patents can be described as a "two-part" system in that the resin to be foamed must be mixed with two components before extrusion. The first component is the alkali metal borohydride. The second component is the activator. Although the system described therein is fully functional and provides acceptable performance, it would also be desirable to supply the borohydride and activator as a single ingredient or mixture of ingredients, i.e. a one-part system, such that only one component need be measured out and mixed with the resin to be foamed prior to the extrusion step.

SUMMARY OF THE INVENTION

The present invention comprises a stable one-part borohydride activator mixture comprising alkali metal borohydride and a salt hydrate incorporated within an inert resinous polymer carrier. All three ingredients may be contained in a single concentrate such as a pellet. In the alternative, a first concentrate may contain borohydride in a carrier, with a second concentrate containing salt hydrate in a carrier. The first and second concentrates are provided in a mixture of appropriate proportions to produce the desired one-part system.

The present invention is also directed to a method of making a stable alkali metal borohydride and activator concentrate comprising blending alkali metal borohydride and a salt hydrate with a dry inert resinous polymer; heating said mixture to a temperature above the melting point of the resin to form a molten mixture but a temperature less than that which would result in the release of a substantial amount of the water of hydration of the salt hydrate; extruding said molten mixture to form a solid, stable concentrate; and forming the extruded and cooled concentrate into pellets. In the method of making the one-part system with two concentrates, the mixing, heating, extruding, and forming are performed separately for a first mixture of carrier and borohydride and a second mixture of carrier and salt hydrate, and then the pellets are mixed.

In another alternative embodiment, the present invention comprises a method of making a cellular article comprising mixing the concentrate with a resinous polymer and extruding the mixture, or mixing the one-part mixture of concentrates with a resinous polymer and extruding the mixture.

DETAILED DESCRIPTION OF THE INVENTION

As stated above, the concentrates of the present invention include alkali metal borohydride, a salt hydrate, and an inert resinous polymer carrier. The water of hydration is released from the salt hydrate as heating occurs thereby allowing the water to serve as the activator for the borohydride.

In a first embodiment, referred to as the one pellet, one-part system, all three ingredients are contained in a single pellet. In a second embodiment, referred to as the two pellet, one-part system, a first pellet contains alkali metal borohydride and carrier, while the second pellet contains salt hydrate and carrier. The second embodiment is particularly advantageous in that it allows the ratio of borohydride to activator to be varied readily. Thus, rather than needing to stock a large number of different one pellet, one-part formulations, the same variety can be obtained by preparing a set of borohydride concentrates of various concentrations, a set of salt hydrate concentrates of various concentrations, and then mixing in the desired proportions.

When used as a blowing agent for thermoplastic resins, up to 1.0% by weight of borohydride may be incorporated into the resin to be foamed from the concentrate. The preferred range is up to 0.25% by weight.

The use of concentrates to incorporate low levels of borohydride into resins has several advantages. First of all, the concentrates protect the borohydride from adventitious hydrolysis during handling and may be stored for long periods of time without the occurrence of significant hydrolysis. In addition, it is much easier to incorporate borohydride at very low levels such as less than 1 percent by weight into the resin to be foamed by using the concentrates. Furthermore, overall handling such as weighing and making uniform mixtures is facilitated using concentrates as compared to neat borohydride. Because the borohydride which is a highly reactive material has been concentrated and rendered substantially inert, employee safety is enhanced. Finally, very uniform dispersions of borohydride in the resin are obtained using the concentrates.

In particular, concentrates which incorporate both the activator and the borohydride in a single concentrate or mixture of concentrates, i.e. a one-part system, are advantageous in that there is no need to separately measure the necessary proportions of borohydride and activator during the mixing with the resin to be foamed. This is in contrast to two-part systems where mixing of the borohydride and activator must take place just prior to being added to the resin which will be foamed during extrusion.

The stable borohydride concentrate of the present invention comprises from about 0.5% to about 25% by weight of an alkali metal borohydride. This range is with respect to the weight of the entire one-part system, whether one pellet or two pellets. The 0.5% lower limit for borohydride is selected primarily because lower concentrations would necessarily involve the use of excessive amounts of the concentrate. The 25% upper limit is selected because higher levels would require excessively small amounts of the concentrate and thereby hamper the attainment of uniform dispersion in the thermoplastic polymer to be foamed.

It is preferred to include the alkali metal borohydride in amounts between 2 and 10% because such range permits let down ratios on the order of about 20:1 as are normally desired in the industry. Sodium and potassium borohydrides are particularly preferred for use in connection with the present invention.

The second ingredient in the concentrate of the present invention is a salt hydrate. By salt hydrate is meant a salt which has been hydrated by the reaction of molecules of water in which the H-OH bond is not split. A given salt often forms more than one hydrate. In the formula of a hydrate, the addition of the water molecules is conventionally indicated by a centered dot with the number of waters of hydration being indicated after the centered dot.

The salt hydrates for use in the present invention must meet essentially three criteria. First, they must have a sufficiently high percent of water content compared to the overall weight of the salt hydrate to avoid the necessity of incorporating large amounts of the salt hydrate in the concentrate, typically greater than 30% by weight. Second, the salt hydrate must retain substantially all of its water at the temperature at which the concentrate is formed by extrusion. Finally, the salt hydrate must release a substantial portion of its water of hydration in the range at which the polymer to be foamed will be extruded. The amount of water released by a salt hydrate by a particular temperature is readily determined by routine testing. The amount of water necessary to activate the borohydride can vary over wide limits without significant effect on the resulting foam. Moreover, as little as one half of the required stoichiometric amount can often be used due to background proton donors, primarily ambient humidity. For example, with polypropylene extruded sheet, the quality of the foam is improved by increasing available water levels to within the range of 300 to 500% of the stoichiometrically required amount. Accordingly, salt hydrate should be included at a concentration sufficient to provide at the temperature of extrusion of the resin to be foamed from about 50% to about 500% of the stoichiometrically required amount of water to activate the borohydride.

Salt hydrates for use in the present invention must not be reducible by the borohydride salt since a chemical reaction between the salt hydrate and the borohydride is undesirable. Instead, what is desired is reaction between the borohydride and the water of hydration released during extrusion of the resin to be foamed. For long term stability of the concentrate and the resin to be foamed, it is also important that the salt hydrates not be hygroscopic, efflorescent, or deliquescent.

It should also be noted that the salt hydrates are compounds in which the water is chemically bound rather than mechanically bound. For example, the use of a molecular sieve in which the water is mechanically bound, is not useful with the plastics which are typically foamed since such mechanically bound water is released at the normal boiling temperature for water, i.e., up to 100° C.

The preferred salt hydrate for use in the present invention when the temperature of extrusion of the resin to be foamed will be less than about 180° C. is $Na_2B_4O_7.5H_2O$, commonly referred to as borax pentahydrate. Borax pentahydrate contains about 31% by weight of water with only approximately 3% by weight of that water lost by a temperature of 100° C., less than 10% by weight lost by approximately 120° C., with the majority lost between 130°-150° C. $MgSO_3.6H_2)$ which contains 51% by weight of water, 8% by weight of the available water being released by 80° C., 12% by weight by 100° C., and 20% by weight by 120° C., is another preferred salt hydrate. Another preferred salt hydrate is $MgSO_4.7H_2O$, commonly referred to as Epsom salts, which contains 51% by weight of water, 10% by weight of the available water being released by 80° C., and 17% being released by 100° C.

For applications where the temperature of extrusion of the resin to be foamed will be higher than about 180° C., the preferred salt hydrate is alumina trihydrate which contains 34.5% by weight of available water, and shows no loss to 260° C., with 14% by weight released by 320° C., and 58% by weight released by 380° C.

Table I below sets forth the literature release temperature, percent water available at that release temperature and the results of thermogravimetric analysis (TGA). The list shown in Table I is not meant to be exhaustive, rather illustrating several commercially available salt hydrates. However, the suitability of other salts not listed in Table I can be readily determined by thermogravimetric analysis using commercially available equipment.

The thermogravimetric analysis set forth in Table I was run on a Perkin Elmer TMA-1. All the salts shown therein were analyzed under a nitrogen atmosphere at a heating rate of 20° C. except alumina trihydrate, which was run at 40° C. per minute.

TABLE 1

| Salt Hydrate | Literature Release T, °C. | % H₂O Avail. At Release T | TGA Results (°C.) |
|---|---|---|---|
| $Na_4P_2O_7.10H_2O$ | 94° | 40 | 25% of avail. H₂O released by 80°<br>43% of avail. H₂O released by 100° |
| $Na_3PO_4.12H_2O$ | 100° | 57 | 17% of avail. H₂O released by 80°<br>28% of avail. H₂O released by 100° |
| $MgSO_4.7H_2O$ | 150° | 44 | 10% of avail. H₂O released by 80° |
| | 200° | 51 | 17% of avail. H₂O released by 100° |
| $MgSO_3.6H_2O$ | 200° | 51 | 8% of avail. H₂O released by 80°<br>12% of avail. H₂O released by 100°<br>20% of avail. H₂O released by 120°<br>Slower release than $MgSO_4.7H_2O$ |
| $ZnSO_4.7H_2O$ | 280° | 44 | 17% of avail. H₂O released by 80°<br>monohydrate >160° |
| $Na_2B_4O_7.5H_2O$ | >120° | 31 | ~3% avail. H₂O lost @ 100°<br><10% avail. H₂O lost @ 120°<br>most lost between 130°–150° |
| Alumina trihydrate | 200–400 most >300 | 34.5 | no loss to 260°<br>14% avail. H₂O lost by 320°<br>58% avail. H₂O lost by 380° |

The inert resinous polymer component of the concentrates comprises resins in which reactive protonic hydrogen atoms are substantially absent. Such resins include polyolefins, polydienes, polystyrene, polyphenylene-oxide-styrene, polyacrylates, ethylene/vinyl acetate copolymers, polyvinyl acetate, and the like. A preferred resin is high impact polystyrene when the temperature of extrusion of the resin to be foamed will be higher than about 180° C. When that temperature will be less than about 180° C., a preferred resin is an ethylene/vinyl acetate copolymer.

The concentrates of the present invention may be used to incorporate low levels of alkali metal borohydride into a resin to be foamed. Upon extruding the resin to be foamed at a temperature above that at which the salt hydrate releases its water of hydration, the water is released and then reacts with the borohydride to foam the resin by the production of hydrogen.

The one pellet, one-part concentrates of the present invention are prepared by dry blending between about 0.5% and about 25% by weight of the borohydride and the carrier with an amount of salt hydrate chosen to release the desired amount of water to react with the borohydride within the temperature range at which the resin to be foamed will be extruded. Accordingly, the amount of salt hydrate will vary depending upon the temperature of extrusion of the final foamed resin and the particular salt hydrate employed. The borohydride and inert resinous polymer used in preparing the concentrate should contain less than about 0.1% of adsorbed water. While the salt hydrate obviously contains a significant amount of water, such water is not available to the borohydride until extrusion with the ultimate resin to be foamed. Any water not so bound may prematurely react with the borohydride.

The amounts of borohydride and salt hydrate overall are the same for the two pellet, one-part system. However, the borohydride is dry blended with part of the carrier while the salt hydrate is dry blended with the remainder of the carrier.

To form the concentrate of the one pellet, one-part system, the mixture of borohydride, salt hydrate and resin is heated to a temperature in excess of the melting point of the resin, but less than a temperature at which the salt hydrate will release a significant amount of water, extruded, cooled, and formed into pellets. Typically, extrusion temperatures will be between about 90° C. and about 110° C. where the resin, to be foamed will be extruded at less than about 180° C. Where higher temperatures will be employed, the temperature of extrusion of the pellets will be between about 170° C. and about 190° C. However, this extrusion temperature will obviously depend upon the salt hydrate and resin employed and may vary accordingly. To form the concentrates of the two pellet, one-part system, the same steps are separately performed on each of the dry blends, only the dry blend containing the salt hydrate needing to be kept below a temperature which would release a significant amount of water.

Typically, a small amount of mineral oil or other similar plasticizer is desirably included in an amount sufficient to wet the surface of the pellets of carrier resin. This encourages the borohydride powder and salt hydrate powder to stick to the pellets of carrier resin until extrusion is performed, thereby facilitating a more uniform mixture.

As mentioned previously, the alkali metal borohydride has utility as a blowing agent in connection with the manufacture of cellular or foamed resinous articles. Typical resinous polymers which may be foamed with the concentrate of the present invention include polymers and copolymers generally, including but not being limited to, polyolefins, polydienes, polystyrene, polyphenylene-oxide-styrene, polyacrylates, polyvinyl chloride, polyvinyl acetate, ethylene/vinyl acetate copolymers and the like.

Cellular articles may be manufactured by mixing the one-part system with a resinous polymer and then extruding at a temperature at which the water of hydration of the salt hydrate is released to hydrolyze substantially all of the alkali metal borohydride and thus form a cellular article.

In choosing the particular concentrate, the temperature of release of the water of hydration by the salt hydrate must be taken into account. If the water of hydration is released prior to the melting of the polymer to be foamed, a significant portion of the water of hydration will be released and react with the borohydride to prematurely produce hydrogen. Such hydrogen will then be simply vented from the extruder without the formation of the desired cellular structure within the plastic to be foamed.

In order to further illustrate the present invention and the advantages thereof, the following specific examples are given, it being understood that these examples are intended only to be illustrative without serving as a limitation on the scope of the present invention.

EXAMPLE 1

The following example illustrates the preparation of a one pellet, one-part system. High impact polystyrene (HIPS) is dried for three hours at about 160° F. Under a nitrogen atmosphere, 2.4 g of mineral oil are added to 812 g of HIPS in a Hobart mixer with stirring, followed by the addition of 50 g of sodium borohydride powder and 137.9 g of alumina trihydrate.

The dry blended mixture is extruded at 175 rpm in a twin screw extruder at about 180° C. using a strand die, cooled, and then pelletized to recover 809 g of pellets.

EXAMPLE 2

The one pellet, one-part system prepared in Example 1 is then used to foam HIPS. A mixture of 950 g of HIPS and 50 g of the concentrate of Example 1 is prepared, and then extruded through a ribbon die at 220° C. and 175 rpm. A foamed ribbon of acceptable properties is produced.

EXAMPLE 3

The following example illustrates a two pellet, one-part system. The sodium borohydride pellets contain 10% by weight of the borohydride. As the activator source, 31% by weight of borax pentahydrate is incorporated in the salt hydrate pellets to provide a stoichiometric amount of water. The carrier resin for the borohydride is HIPS. Two different carrier resins are used for the salt hydrate. One resin is ELVAX 250 (a trademark of Dupont for a 28% vinyl acetate, ethylene-vinyl acetate copolymer with a melt index of 25) and the other resin is polyethylene (sold by U.S. Industrial Chemicals Co. under the trademark MICROTHENE MM-710-20 with a melt index of 25). The salt hydrate concentrate based upon the ELVAX 250 is extruded at 90° C. at 60 to 75 rpm in a twin screw extruder. The salt hydrate concentrate utilizing polyethylene resin is extruded at 110° C. and 125 rpm in a twin screw extruder.

EXAMPLE 4

Foamed ribbons are extruded from mixtures of:
487.5 grams of HIPS,
12.5 grams of the sodium borohydride containing pellets of Example 3, and
12.5 grams of one of the salt hydrate concentrates of Example 3.

After dry blending the three ingredients, the resulting blend is extruded at 200° C. and 125 rpm using a twin screw extruder. Utilizing either of the borax resin concentrates, about a 30% density reduction is obtained by comparison against extrusion of HIPS containing no sodium borohydride, or by comparison against extrusion of 2.5% by weight of ELVAX 250 resin or 2.5% by weight of polyethylene in HIPS resin containing no sodium borohydride. In contrast, a control formulation containing 2.5% by weight of sodium borohydride-HIPS resin concentrate in 97.5% by weight of HIPS resin results in an 18% density reduction, although there appears to be little foaming.

EXAMPLE 5

To determine the stability of the concentrates of Example 3, a manometer test is made comparing a mixture of borax pentahydrate/ELVAX 250 resin and sodium borohydride/HIPS concentrates against sodium borohydride/HIPS concentrate alone. Neither shows any outgassing after one week.

To test longer term stability, equal weight mixtures of each of the borax pentahydrate concentrates of Example 3 are stored individually with the sodium borohydride concentrate of Example 3. After 10 months, samples from the sealed and unsealed jars are assayed for % SBH. For the sealed jar containing borax pentahydrate in ELVAX 250 resin, 4.9% of the original 5% by weight of sodium borohydride remains, meaning that essentially no decomposition has occurred. While only 1.2% by weight remains for the polyethylene sample, it is believed that the decomposition is probably due to a faulty seal. For the unsealed jars, less than 0.05 and 0.04% by weight respectively of sodium borohydride remain, which is not unexpected since sodium borohydride concentrate by itself will decompose over this period of time at ambient conditions.

While the invention has been described in terms of various preferred embodiments, one skilled in the art will appreciate that various modifications, substitutions, omissions, and changes may be made without departing from the spirit thereof. Accordingly, it is intended that the scope of the present invention be limited solely by the scope of the following claims.

What is claimed is:

1. A stable one-part borohydride activator concentrate which has been previously blended and melted consisting essentially an inert resinous polymer, an alkali metal borohydride and a salt hydrate.

2. The concentrate of claim 1 wherein the borohydride is present at between about 0.5% and about 25.0% by weight.

3. The concentrate of claim 1 wherein the alkali metal borohydride is sodium borohydride or potassium borohydride.

4. The concentrate of claim 1 wherein the salt hydrate is $Na_2B_4O_7.5H_2O$, $MgSO_3.6H_2O$, $MgSO_4.7H_2O$, or alumina trihydrate.

5. The concentrate of claim 1 wherein the resin is a polyolefin, polydiene, polystyrene, polyphenylene oxide-styrene, polyacrylate, or polyvinylacetate.

6. A stable, one-part borohydride activator system consisting essentially a mixture of a first composition and a second composition wherein:
   (a) the first concentrate which has been previously blended and melted composition comprises an inert resinous polymer and an alkali metal borohydride; and
   (b) the second concentrate which has been previously blended and melted composition comprises an inert resinous polymer and a salt hydrate.

7. The system of claim 6 wherein the borohydride is present at between about 0.5% and about 25.0% by weight.

8. The system of claim 6 wherein the alkali metal borohydride is sodium borohydride or potassium borohydride.

9. The system of claim 6 wherein the salt hydrate is $Na_2B_4O_7.5H_2O$, $MgSO_3.6H_2O$, $MgSO_4.7H_2O$, or alumina trihydrate.

10. The system of claim 6 wherein the resin is a polyolefin, polydiene, polystyrene, polyphenylene oxide-styrene, polyacrylate, or polyvinylacetate.

11. A method of making a cellular article comprising:
   (a) mixing a foaming effective amount of the concentrate of claim 1 with a resinous polymer; and (b) extruding the mixture at a temperature at which the resinous polymer is molten when the water of hydration is released to hydrolyze the borohydride.

12. A method of making a cellular article comprising:

(a) mixing a foaming effective amount of the system of claim 6 with a resinous polymer; and
(b) extruding the mixture at a temperature at which the resinous polymer is molten when the water of hydration is released to hydrolyze the borohydride.

* * * * *